No. 726,963. PATENTED MAY 5, 1903.
C. J. A. MICHALKE.
MEANS FOR PREVENTING THE DISTURBANCE OF TELEPHONE CIRCUITS.
APPLICATION FILED JUNE 27, 1898.
NO MODEL.
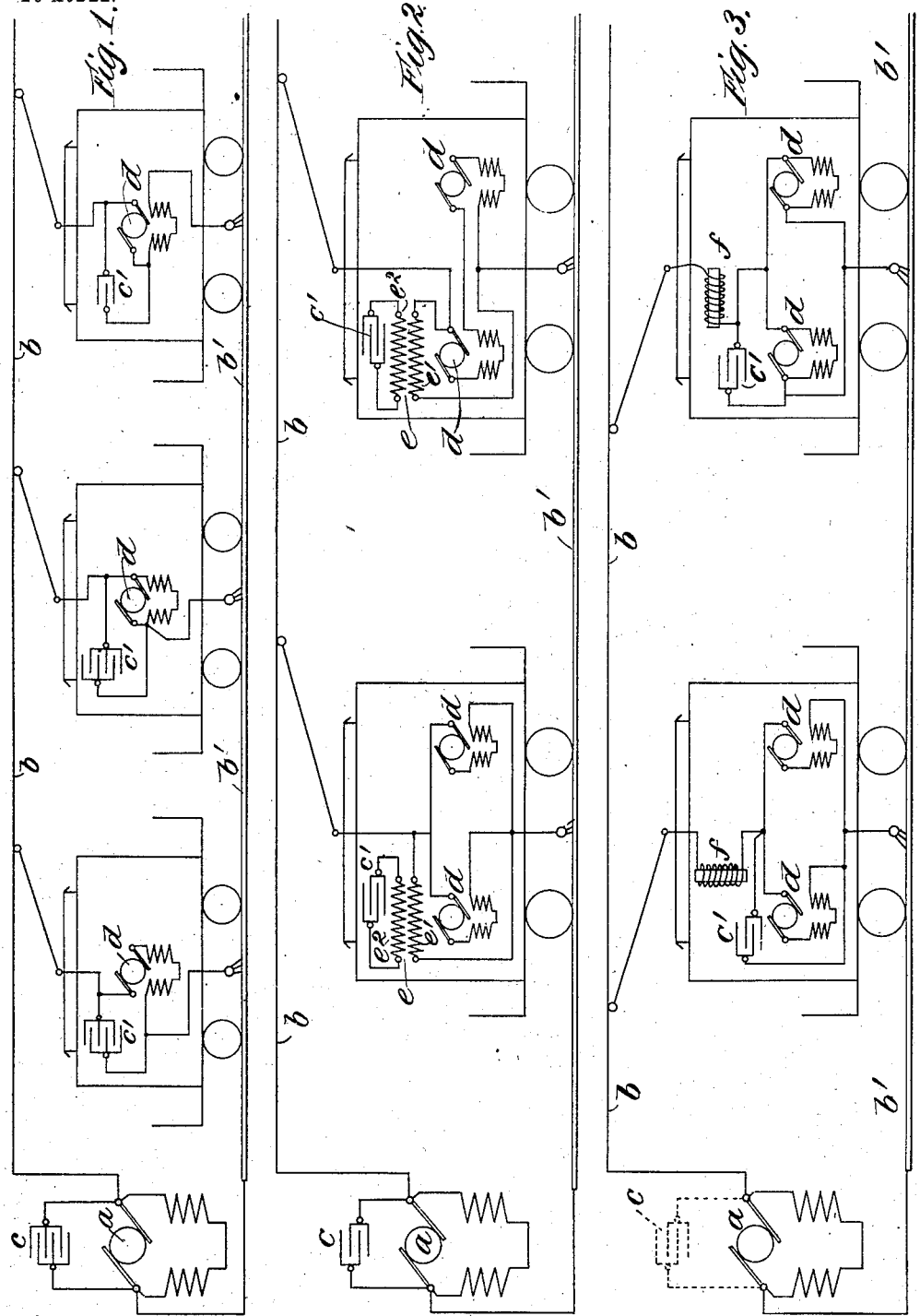
Witnesses:
Inventor
Carl Joseph August Michalke
By Barton & Brown
Attorneys.

No. 726,963.

Patented May 5, 1903.

UNITED STATES PATENT OFFICE.

CARL' JOSEPH AUGUST MICHALKE, OF CHARLOTTENBURG, GERMANY, ASSIGNOR TO THE SIEMENS & HALSKE ELECTRIC COMPANY OF AMERICA, OF CHICAGO, ILLINOIS, A CORPORATION OF ILLINOIS.

MEANS FOR PREVENTING THE DISTURBANCE OF TELEPHONE-CIRCUITS.

SPECIFICATION forming part of Letters Patent No. 726,963, dated May 5, 1903.

Application filed June 27, 1898. Serial No. 684,565. (No model.)

*To all whom it may concern:*

Be it known that I, CARL JOSEPH AUGUST MICHALKE, a subject of the Emperor of Germany, residing at Charlottenburg, Germany, have invented a certain new and useful Improvement in Means for Preventing the Disturbance of Telephone - Circuits, (Case No. 150,) of which the following is a full, clear, concise, and exact description.

My invention relates to improvements in means for preventing the disturbance of telephonic circuits, and has for its object the elimination or necessary reduction of disturbing-currents in systems of electrical distribution, whereby neighboring telephone-lines may be operated without interference.

It has previously been attempted to secure immunity from the disturbing influences of heavy commercial currents by associating with each terminal of the main generator of a system of distribution an impedance-coil and connecting a condenser of suitable size between the conductors at the farther extremity of the working circuit; but experiment has shown that this arrangement of apparatus does not secure the desired result, and when heavy currents are used the disturbance is sometimes intensified, although theoretically the system is expected to reduce or deaden the disturbing effect of heavy commercial currents.

Applied to a system of electrical traction, for example, the pulsations of current which originate at the main generator and the several motors connected in the system are received by the condenser and tension is maintained approximately constant thereby. This maintenance of a constant tension is based upon the establishment of equalizing-currents between the condenser and motor or between the condenser and main generator. If, however, the condenser is located at a considerable distance from the motor or generator, the equalizing - currents will be impressed upon long lengths of conductor extending between the condenser and connected dynamo-electric machines, which currents in consequence will cause more or less serious disturbance of neighboring telephone-lines. I conceived, however, that by connecting a condenser between the terminals of the motor or group of motors upon the several cars of the system as well as between the terminals of the main generator at the power - station the equalizing-currents might be prevented from reaching portions of the conductors of said system which would affect telephone-lines in the vicinity of the disturbing influences.

Pursuant to the theoretical consideration, I have ascertained by experiment that by connecting condensers in systems of electrical distribution in immediate association with or in proximity to the translating devices and the main generator, respectively, in parallel with the terminals of the same the beneficial results sought to be attained are thereby secured. Disturbances, however, arising through unequal loading of the several portions of a system of distribution—such, for example, as motors carrying widely-varying loads—will impress upon the main conductors of the system equalizing-currents, which must be guarded against. In systems of electrical traction, moreover, other disturbances than those arising from the connected dynamo-electric machines occur. For example, imperfect contact at the trolley and wheels of the motor-car will tend to set up decided disturbing influences in the system as will also sudden interruptions of the current caused by the trolley slipping from the overhead conducting-wire. I have therefore sought to overcome such disturbing influences as well by associating with the system condensers having a very high static capacity but relatively small current capacity.

I will describe my invention more in detail with reference to the accompanying drawings, exemplifying various applications of my invention to a traction system, wherein—

Figure 1 illustrates an arrangement of apparatus with condensers connected directly between the terminals of the motors and main generator of a system of electrical traction. Fig. 2 illustrates the association of condensers and induction coils or transformers with the several motors of such a system, and Fig. 3 illustrates the association of impedance coils and condensers with the propelling-motors mounted upon the cars.

The same letter of reference is used to designate like parts in each of the figures of the drawings.

The arrangement of apparatus shown in the system of Fig. 1 consists of a main generator $a$, supplying current to the several cars of a traction system through the medium of the trolley-conductor $b$ and the rails $b'$ of the system. A condenser $c$ is connected in parallel between the terminals of the main generator, and condensers $c'$, of high static capacity and relatively small current capacity, are connected in parallel between the terminals of the motors $d$, serving to propel the cars.

The system of Fig. 2 differs from the above only by the inclusion in the shunt-circuit of the groups of motors $d\ d$ of the primary $e'$ of an induction coil or transformer $e$, whose secondary $e^2$ in turn is connected with the condenser $c'$.

The arrangement of apparatus diagrammatically indicated in Fig. 3 of the drawings differs from that of Fig. 1 by the inclusion in the motor-circuits of the car of an impedance-coil $f$ and, if desired, the omission of the condenser $c$, shown connected between the terminals of the main generator $a$.

The arrangement of apparatus indicated in the last figure of the drawings I have found secures the most effective protection of telephone-lines from the disturbing influences of a circuit otherwise likely to interfere with the successful operation of such lines.

Experience has shown that only the small current fluctuations which are commonly met with in systems having a motor-load are most to be guarded against, since the capacity effect of the circuit is especially noticeable on account of the high frequency. Ordinary variations of current in the circuits usually are without effect, as such changes do not occur suddenly. Cutting out the motors does not materially affect by induction neighboring telephone-circuits, inasmuch as the current is subjected to a relatively gradual decrease by the formation of arcs when the circuit is opened. It may be noted that disturbances will be caused under the same circumstances if the magnetic or other effective arc-extinguisher is employed in connection with the controller. An absorption of a part of the energy by the condensers takes place upon a sudden increase in the current, which is thus returned to the motor with a lag. When the induction or choke coils are also employed in connection with the motor-circuits, they prevent any sudden increase of current by reason of their self-induction. They are equally advantageous when the motors are disconnected, since the choke-coils prevent any sudden drop in the current. It may be remarked, however, that the disturbing influences created by the cutting in and out of the motors in any event are not nearly so troublesome as those caused by the continuous-current disturbances. These disturbing small but rapid fluctuations spring from numerous causes, such as short-circuiting single coils of the armature by the commutator-brushes, the vibration of carbon-brushes upon an imperfect commutator in the manner of a microphone-disk, and the variable magnetic resistance of the armature. A sudden change in the load of a motor causes relatively little disturbance. The lasting or continuous noises are those most to be guarded against in the telephones likely to be affected.

I have indicated by the above drawings that the condensers may be directly connected between the terminals of the motor or of its armature, or the same may be inductively associated with the motors or groups of motors to secure the desired protection.

The condensers employed in the system may be of any suitable form, although preferably constructed so as to secure the highest static capacity, while, in addition, such condensers preferably are given small current capacity. Condensers of this type are capable of receiving a heavy charging-current, while absorbing a small amount of energy, and thus preventing any large discharge which would affect neighboring telephone-lines. It has been found in practice that lead-accumulators are not as desirable for use as are fixed condensers, since with the former a large decrease in the impressed pressure is followed by a counter-current sent through the circuit by the accumulator, which is likely to inductively disturb the telephone-lines.

Under some circumstances in order to more effectually overcome the disturbing influences of equalizing-currents between two or more condensers the arrangement illustrated in Fig. 2 may be employed, wherein the condensers are maintained in electrical association with the motor-circuit only through the secondary coils of a transformer, the primary coils being connected in parallel between the motor-terminals. With this arrangement of apparatus the primary winding, which is adjusted to receive the direct current, serves to supply the excitation for the secondary, which in turn, through the medium of the condenser, prevents external disturbing-currents. As previously stated, however, under ordinary circumstances the best results may be obtained by utilizing the general arrangement of apparatus indicated in Fig. 3, whereby impedance-coils, designed to receive and transmit current from the main circuit, are interposed between the mains of the system. When thus associated with condensers, their effectiveness is not only increased, but the equalizing-currents tending to be established between the several motors or groups of motors of the system are correspondingly reduced.

It is apparent from the above considerations that various alterations in the association of the protecting devices with a system of electrical distribution may be made without departing from the spirit of my invention, since it is the object thereof to reduce the lengths or portions of conductor to a minimum, wherein disturbing-currents may be set up, and accordingly the systems herein shown may be taken merely as examples of means for accomplishing the desired results.

Having now described my invention, what I claim as new, and desire to secure by Letters Patent, is—

1. The combination with a direct-current system of electrical distribution and a plurality of motors connected in parallel to mains of said system, of condensers connected respectively to said motors so as to be responsive to voltage fluctuations of the motors, the said condensers thereby being adapted to dampen the effect of the small voltage or pressure changes of the direct current, substantially as set forth.

2. The combination with a direct-current system of electric traction, and a plurality of parallel connected motors or groups of motors deriving power from said system, of a main reactive device associated with the source of power, a series of reactive devices associated, each to each, with the several motors or groups of motors of the system, the said devices being adapted to dampen the small pulsations normally incident to the flow of the direct current, substantially as set forth.

3. The combination with a system of electric traction operated by direct current, of condensers associated with the electric motors propelling the cars or vehicles of said traction system and carried by said cars or vehicles, substantially as set forth.

4. The combination with a system of electrical traction operated by direct current, of a condenser associated with the main generator of said system, and additional condensers associated with the electric motors propelling the cars or vehicles of said traction system, substantially as described.

5. In a system of electric traction, the combination with a condenser associated with the main generator of said system, of additional condensers associated each to each with the motors or groups of motors deriving power from the said generator, the said condensers being relatively small but having high static capacity, substantially as and for the purpose described.

6. The combination with a system of electrical distribution, of a condenser $c$ electrically associated with the main generator $a$ of said system, and condensers $c'$ of relatively small current capacity but high static capacity associated at intervals with the conductors $b$ $b'$ of said system, said condensers being adapted to equalize continued slight pressure changes, and not being adapted to act as conductors to convey active current of said system, substantially as described.

7. The combination in a system of electric traction, with the dynamo $a$, of condenser $c$ electrically associated therewith, the motors $d$ receiving current from said system and adapted to supply the tractive power, and condensers $c'$ mounted upon the moving cars or vehicles and electrically associated with said motors, whereby disturbance of neighboring telephonic circuits is obviated, said condensers being adapted to equalize continued slight pressure changes, and not being adapted to act as conductors to convey active current of said system, substantially as described.

8. The combination with a system of electrical distribution, of translating devices connected with the said system and adapted to be operated thereby, and condensers of high static capacity and relatively small current capacity associated throughout the system with the translating devices and responsive respectively to the voltages of said translating devices, said condensers being adapted to equalize continued slight pressure changes, and not being adapted to act as conductors to convey active current of said system, substantially as and for the purpose specified.

9. The combination, with a system of electrical distribution, of translating devices connected with the said system and adapted to be operated thereby, impedance-coils, and condensers of high static capacity and relatively small current capacity associated throughout the system with the translating devices and responsive respectively to the voltages of said translating devices, said condensers being adapted to equalize continued slight pressure changes, and not being adapted to act as conductors to convey active current of said system, substantially as and for the purpose specified.

In witness whereof I hereunto subscribe my name this 7th day of June, A. D. 1898.

CARL JOSEPH AUGUST MICHALKE.

Witnesses:
HENRY HASPER,
C. H. DAY.